United States Patent [19]

Stephenson

[11] 4,315,438

[45] Feb. 16, 1982

[54] CONVERSION ASSEMBLY FOR DISPENSING PUMPS AND THE LIKE

[75] Inventor: Tom Stephenson, Simsbury, Conn.

[73] Assignee: Petroleum Meter & Pump Co., Inc., Avon, Conn.

[21] Appl. No.: 142,039

[22] Filed: Apr. 21, 1980

[51] Int. Cl.$^3$ .................... F16H 3/34

[52] U.S. Cl. .................... 74/352; 235/94 R

[58] Field of Search .................... 74/352; 235/94 R

[56] References Cited

U.S. PATENT DOCUMENTS

| | | | |
|---|---|---|---|
| 2,463,594 | 3/1949 | Brigham | 235/103 |
| 2,814,444 | 11/1957 | Bliss | 235/94 R |
| 3,355,100 | 11/1967 | Sundblom | 235/61 M |
| 3,419,980 | 1/1969 | Zillmer | 74/352 X |
| 3,618,852 | 11/1971 | Kes | 235/94 R |
| 3,635,395 | 1/1972 | Walsh | 235/1 A |
| 3,727,833 | 4/1973 | Muller | 235/1 C X |
| 3,863,839 | 2/1975 | Batson | 235/94 R |
| 3,916,166 | 10/1975 | Smilgys | 235/94 R |
| 3,938,736 | 2/1976 | Coleman | 235/94 R |
| 3,943,340 | 3/1976 | Seitz | 235/94 R |

*Primary Examiner*—Nile C. Byers, Jr.

[57] ABSTRACT

An assembly for installation into a fuel dispensing pump permits its conversion from gallon- to liter-based operation upon the mere pulling of a shift pin.

13 Claims, 6 Drawing Figures

CONVERSION ASSEMBLY FOR DISPENSING PUMPS AND THE LIKE

BACKGROUND OF THE INVENTION

A practical consequence of national conversion to a full metric system of weights and measures is the widespread need that it creates to modify certain equipment to accommodate the new system. Such a need exists in countries such as the United States and Canada, where gasoline has historically been dispensed in either U.S. or Imperial gallons.

From the mechanical standpoint, it is of course a relatively simple matter to alter the mechanisms of existing gasoline dispensing pumps, so as to change the ratios to reflect the volumetric relationship between gallons and liters. Since, however, the avoidance of undue confusion will necessitate introduction of such a liter-based dispensing system uniformly throughout the affected regions, preparations must be made to convert large numbers of pumps at virtually the same time. To enable ongoing operation, moreover, the pumps must be adapted to dispense gasoline on a gallon basis until the time for conversion arrives, at which time the means must be in place to enable quick and easy conversion to the liter mode.

The need for such a device has previously been appreciated, and numerous attempts have been made to satisfy it; for example, variator input-modifying gear boxes have been proposed for that purpose in U.S. Pat. Nos. 3,938,736, and 3,943,340. While the concept underlying that approach to the problem is sound, the mechanisms implementing it are rather complex. Moreover, in the device of U.S. Pat. No. 3,943,340 it is found possible to achieve a neutral position in which the pump can be operated without causing the computer to register. Finally, the slide used therein to effect conversion would not accommodate a seal in the shifted position, and has a tendency to break.

Accordingly, it is the primary object of the present invention to provide a novel assembly for installation in a fuel dispensing pump, or the like, to convert the computer thereof to a modified volumetric basis for the dispensing function.

It is a more specific object of the invention to provide such an assembly which is adapted to render the pump capable of operation in either the gallon-based or the liter-based mode, and in which the conversion is effected quickly, simply and at no cost.

Another object of the invention is to provide such a device having tamper- and accident-resisting features, enabling facile intentional conversion from gallon to liter units while permitting reversal only with considerable difficulty.

Yet another object of the invention is to provide an assembly having the foregoing features and advantages which is also of uncomplicated design, rendering it dependable, easy to install and service, and relatively inexpensive to manufacture

SUMMARY OF THE DISCLOSURE

It has now been found that the foregoing and related objects are readily attained in a converter for a fuel pump computer comprising a housing, a drive shaft mounted in the housing for rotation about a fixed axis and adapted for driven engagement with the pump meter, and a driven shaft coaxially rotatably mounted in the housing and adapted for driving engagement with the variator of the computer. A gear assembly is comprised of two drive gears coaxially disposed for independent rotation about the fixed axis, and at least one of them is a compound gear including first and second coaxial gear elements; the drive shaft and the driven shaft are each affixed to a different one of the drive gears. A slide member is mounted in the housing adjacent the gear assembly for movement between first and second positions. Mounted on the slide member, for rotation about a first axis parallel to the fixed axis and spaced laterally to one side of the gear assembly, is a first idler gear constructed complementarily to mesh with the "first" gear element of the compound drive gear and the other drive gear, to couple them for simultaneous rotation. A second idler gear is mounted on the slide member, for rotation about a second axis parallel to the fixed axis and spaced laterally to the opposite side of the gear assembly, and it is complimentarily constructed to mesh with the "second" gear element of the compound drive gear and the "other" drive gear, to couple them for simultaneous rotation. Biasing means is provided in the housing to urge the slide member toward the second position thereof, and mechanical locking means is disengageably mounted therein to lock the slide member in its first position; the locking means is exteriorly accessible for disengagement to release the slide member for movement to the second position under the force of the biasing means. The idler gears are so positioned on the slide member that a different one of them engages the gear assembly in each position thereof. As a result, the slide member may be so positioned that the drive shaft is rotatable by the driven shaft in one ratio, by effecting engagement of the "first" idler gear simultaneously with the "other" drive gear and the "first" gear element of the compound drive gear. Alternatively, the slide member may be repositioned so that the driven shaft is rotatable by the drive shaft in a different ratio, by effecting interengagement of the "second" idler gear simultaneously with the "other" drive gear and the "second" gear element of the compound drive gear.

In preferred and specific embodiments of the converter, the drive shaft will engage the pump meter with the "other", or meter driven, simple drive gear, and the driven shaft will engage the computer variator with the compound computer drive gear; normally, the converter will be specifically adapted for a gallon/liter conversion. In such a case, the "first" idler gear may be a simple gear, used for the gallon mode, and the "second" idler gear may be a compound gear, used for the liter mode and having first and second gear elements constructed to mesh, respectively, with the meter driven gear and the "second" gear element of the computer drive gear. The so-called "first" and "second" gear elements of the computer drive gear will usually be of different diameters, with that of the "first" gear element advantageously being larger than that of the "second", and equal to the diameter of the meter driven gear. Normally, the larger or "first" gear element of the computer drive gear and the meter driven gear will have the same number of teeth, so that the driven variator shaft may be rotated by the meter drive shaft in a 1:1 ratio, through engagement of the gallon mode idler gear; engagement of the liter mode idler gear will produce a rotation ratio of the meter shaft to the variator shaft of 1:3. 7857.

The meter driven gear and its affixed shaft may have an axial bore, and the computer drive gear may have an affixed shaft portion seated therewithin, with the larger gear element thereof directly adjacent the meter driven gear; the gear elements of the liter mode idler gear may be axially spaced from one another to accommodate the larger gear element of the computer drive gear therebetween.

In especially preferred embodiments, the slide member moves on a rectilinear axis on which the "first" and "second" parallel axes are disposed and from which the fixed axis is offset, and the housing will have a portion providing a recessed slideway for the slide member. The locking means most desirably comprises a pin, with the housing having an opening to receive the pin in a position to engage the slide member. Such an opening will preferably extend through the slideway-providing recessed portion, so that, when received therein, the pin resides partially within the slideway adjacent one end thereof, with the corresponding end of the slide member abutting the pin in the first position of the slide member. The biasing means will generally act upon the opposite end of the slide member, and will advantageously comprise a coil spring seated within the slideway.

While most meters are designed to produce four revolutions of the drive shaft for each gallon of fuel dispensed, certain units operate at an eight revolutions per gallon ratio. For use with such pumps, the present converter may utilize compound idler gears for both the gallon and also the liter modes, so as to produce a 2:1 ratio in the first instance and a 1.8929 ratio in the second. Appropriate diameters, spacings and numbers of teeth are, of course, provided for on the gears and gear elements of a converter intended for such use. Specifically, the simple drive gear may have 28 teeth; the compound drive gear may have elements of 16 and 23 teeth; the gallon mode idler gear may have elements of 28 and 32 teeth (for engagement with the simple drive gear and the 16 tooth element of the compound drive gear respectively); and the liter mode idler gear may have elements of 53 and 23 teeth (for engagement with the simple drive gear and the 23 tooth element of the compound drive gear, respectively).

DETAILED DESCRIPTION OF THE ILLUSTRATED EMBODIMENT

Figure 1:
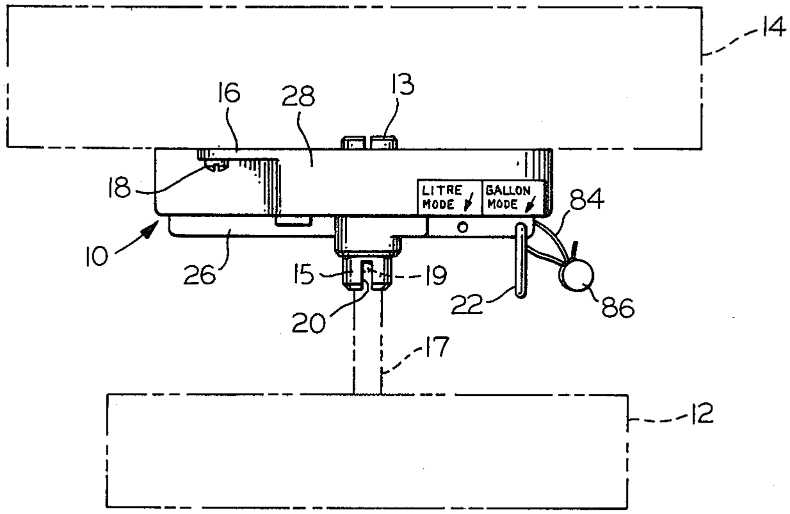
FIG. 1 is a side elevational view of a conversion assembly embodying the present invention, installed between the meter and the variator of a fuel dispensing pump, the meter and the variator being shown in phantom line.
Figure 2:
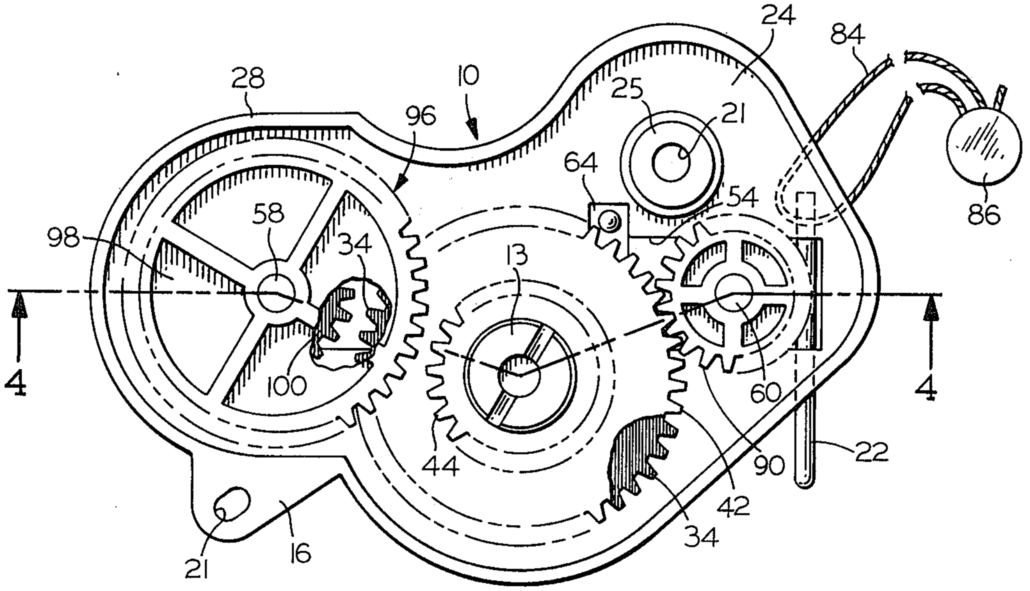
FIG. 2 is a plan view of the assembly of FIG. 1, drawn to an enlarged scale with portions broken away to expose underlying elements.
Figure 3:
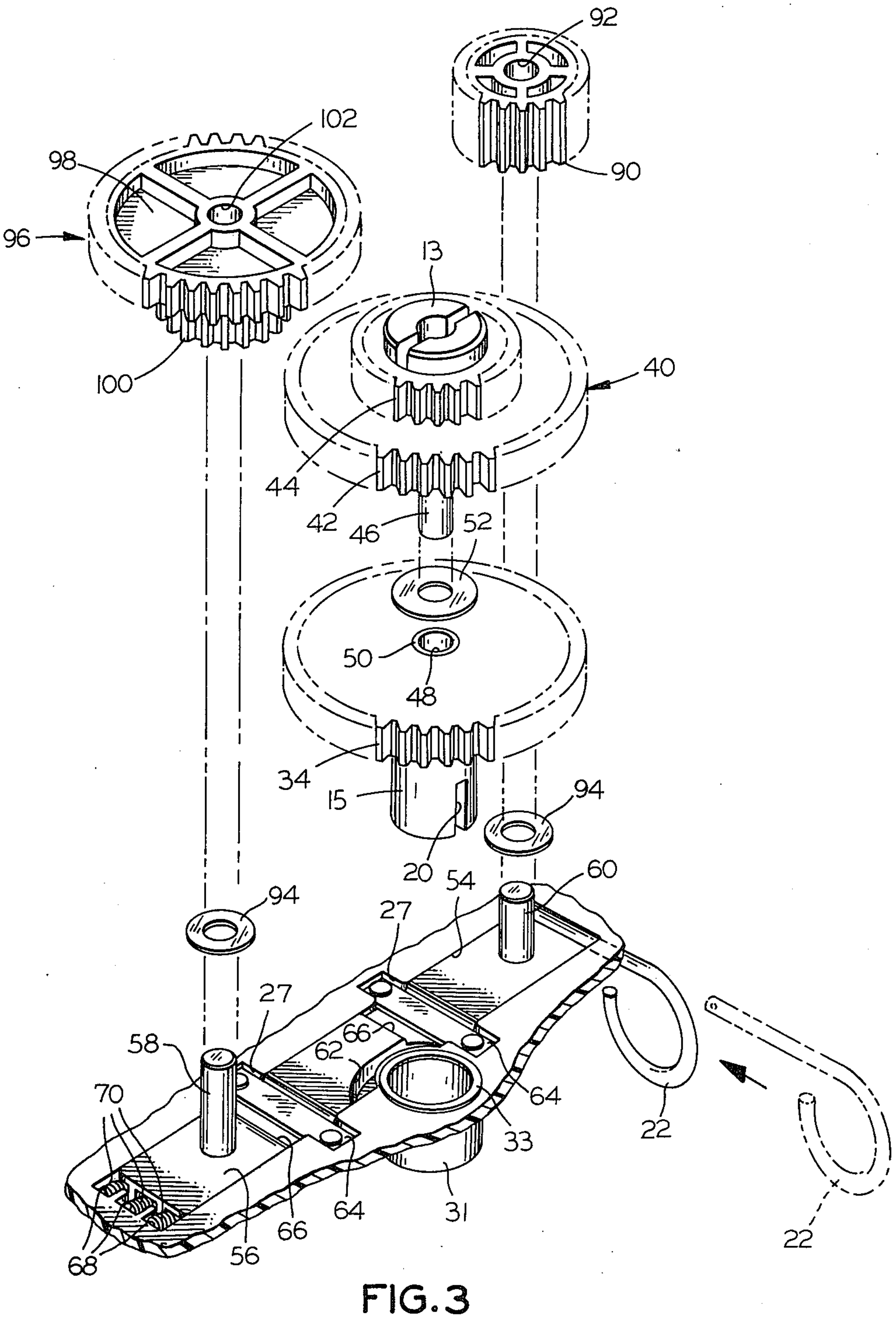
FIG. 3 is an exploded perspective view of the assembly of FIGS. 1 and 2, drawn substantially to the scale of FIG. 2, showing only a fragment of the gear box housing and, in phantom line, the locking pin disengaged therefrom.

Turning now in detail to FIG. 1 of the appended drawings, therein illustrated is a conversion assembly or unit embodying the present invention, installed between the meter 12 and the variator 14 of a conventional gasoline dispensing pump. The conversion unit includes a rigid plastic housing, generally designated by the numeral 10, through portions of which (such as the integrally formed flange 16) pass bolts 18 (only one of which is seen) to secure the unit to the underside of the variator. A slotted hub 13 protrudes above the housing 10 into engagement with an appropriate coupling (not shown) of the variator 14, and a slotted hollow shat 15 extends downwardly to receive the upper end of the meter drive shaft 17, the crosspin 19 of which is engaged in the slot 20 of the shaft 15 to couple them for rotation (in some instances, the coupling features provided on the shafts 15 and 17 will be reversed). The housing 10 bears the indicia "LITER MODE" and "GALLON MODE" to designate proper placement of the locking pin 22, depending upon the operating mode for which the unit has been set.

With additional reference now to FIGS. 2-5, the housing 10 consists of a bottom wall 24 and a peripheral sidewall 28. The bottom wall 24 has an upstanding boss 25 formed therein which, like the flange 16, has an aperture 21 therethrough to receive a securing bolt 18. An enlarged, downwardly extending rectangular portion 26 is molded into the bottom wall 24, as are transversely aligned slot portions 27, all for purposes to be described hereinbelow.

The bottom wall 24 also has a passageway 30 of circular cross section formed therethrough and defined by the cylindrical portion 31 thereof, in which is engaged a bushing 32 of brass or similar material. Seated within the bushing 32 is the shaft 15, which in turn is attached to the main drive gear 34 of the converter assembly; a shim washer 33 is interposed therebetween.

A compound variator drive gear, generally designated by the numeral 40, consists of a relatively large diameter gear element 42 and a relatively small diameter gear element 44, cast as a single unit and secured to the shaft 46 which is integrally formed with the hub 13. The shaft 46 is of such a diameter as to permit it to be rotatably received in the bore 48 of the bushing 50, which is secured within the axial bore of the shaft 15, and a suitable shim washer 52 is interposed therebetween. Thus, the gears 34 and 40 are coaxially rotatable independently of one another; it will also be noted that the diameters and the number of teeth on the gear 34 and on the gear element 42 are equal, for a purpose to be more fully described hereinbelow.

The enlarged rectangular portion 26 formed in the bottom wall 24 provides an elongated slideway 54 therein adjacent to the passageway 30. Within the slideway 54 is seated a slide 56, from the opposite ends of which project upstanding posts 58,60. The slide 56 has a curvilinear notch 62 centrally disposed along one of its longer sides to accommodate the inward projection of the cylindrical portion 31, and to permit movement of the slide 56 thereby. Retaining crossbars 64 are seated within the recesses 27 and are appropriately secured, such as by integrally formed studs, for the purpose of preventing disassembly of the slide 56, the top surface of which is recessed at 66 to accommodate the crossbars 64.

One end of the slideway 54 is partitioned to provide three slots 68, in each of which is seated a small coil spring 70 bearing against the adjacent short vertical wall 72. The slide 56 has corresponding receptacle portions 74 to seat the opposite end portions of the springs 70.

Figure 6:
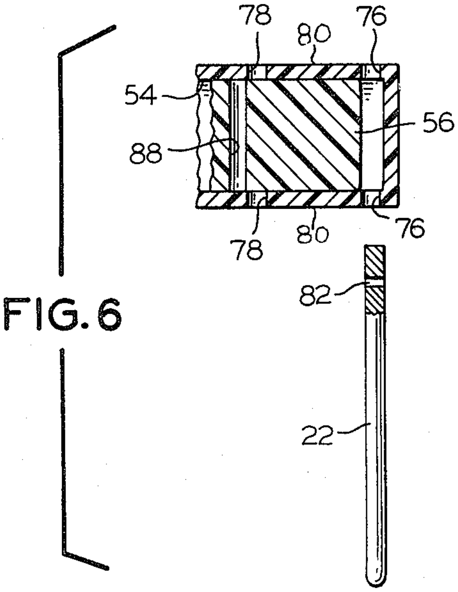
FIG. 6 is a fragmentary sectional view taken along line 6—6 of FIG. 4, with the locking pin disengaged from the associated portion of the housing.

At the opposite end of the slideway 54, and as is best seen in FIG. 6, two sets of transversely aligned holes 76 and 78 are formed through the opposing sidewall portions 80 of the enlarged portion 26, and are adapted to receive the locking pin 22 therethrough. The pin 22 in turn has a small transverse hole 82 in its outer end, through which is inserted the wire 84 of the anti-tamper wire seal 86. The slide 56 also has a passageway 88 to receive the pin 22.

Mounted upon the post 60 at one end of the slide 56 is a relatively small idler gear 90, which has a post-receiving bore 92 for that purpose; a shim washer 94 is interposed between it and the surface of the slide 56. Similarly mounted upon the other post 58 is a compound idler gear, generally designated by the numeral 96, consisting of a relatively large diameter gear element 98 and a relatively small diameter gear element 100; it is, of course, also provided with an appropriate bore 102 for receiving the post 58.

Figure 4:
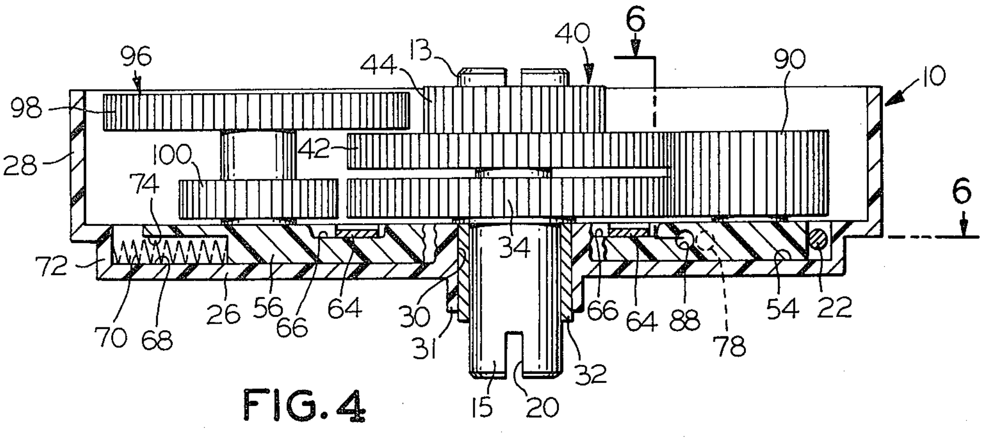
FIG. 4 is a cross-sectional view of the assembly taken along 4—4 of FIG. 2, with the slide in one of the alternative positions thereof and with the gears shown in full section.

With specific reference now to FIG. 4, engagement of the pin 22 through the outermost set of holes 76 locks the slide 56 against the force of the springs 70. In that position, the simple idler gear 90 is in simultaneous meshing engagement with the main drive gear 34 and the larger gear element 42 of the compound gear 40, thereby coupling them for conjoint rotation. Because the gear 34 and the gear element 42 are substantially identical, rotation of the shaft 15 will be transmitted to the hub 13 at a 1:1 ratio, thereby producing the normal drive relationship between the meter 12 and the variator 14.

Figure 5:
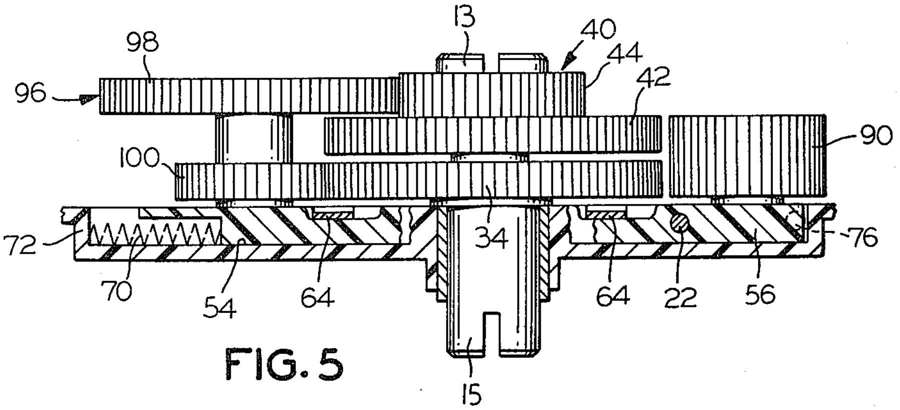
FIG. 5 is a view similar to that of FIG. 4, with the slide in the other of its positions and with the housing fragmentarily illustrated.

Disengagement of the pin 22 from the holes 76 will permit the slide 56, under the force of the springs 70, to shift to the extended position shown in FIG. 5, effecting disengagement of the simple gear 90 and engagement of the compound gear 96. Specifically, the relatively small gear element 100 and the relatively large gear element 98 of the compound idler gear 96 will mesh respectively with the main drive gear 34 and the small gear element 44 of the compound variator drive gear 40. In this manner, the hub 13 will be caused to rotate at a ratio other than 1:1 to that of the shaft 15, thereby altering the drive relationship that would normally exist between the meter 12 and the variator 14. As seen in FIG. 5, the pin 22 is reinserted into the housing through the second set of holes 78, to pass through the passageway 88 of the slide 56 so as to thereby secure it in the extended position; a wire seal may be applied to discourage tampering.

As will be appreciated, the 1:1 drive ratio will typically be employed initially, to maintain the normal gallon dispensing mode of the standard pump. When conversion is to be made, it is necessary only to remove the sealing wire and pull the shift, or locking, pin, whereupon the compound idler gear will replace the simple idler gear in the gear train, to produce (for liter mode dispensing) a ratio producing 3.7857 revolutions of the variator drive for each revolution of the pump meter drive (the small discrepancy from the precise liter:gallon ratio of 3.7854:1 is virtually imperceptable as a practical matter, and is well within industry tolerances, and need not be compensated for). Of course, it will be necessary to change the computer price settings to reflect the established price per liter, and suitable modifications will be made to the pump dial face, such as by the application of appropriate masking decals.

Although the foregoing description has emphasized the gallon-to-liter conversion, it will be understood that the assembly of the invention is equally suited for other conversions that might be desired. Also, in appropriate circumstances the assembly may be used in connection with other substances, references to "fuel pump" being solely for context, that being the normal environment for the device. Moreover it will be appreciated that the assembly of the invention is adapted for incorporation into new pumps as well as for on-site installation into pumps in use.

Thus, it can be seen that the present invention provides a novel assembly for installation in a fuel dispensing pump, or the like, to convert the computer thereof to a modified volumetric basis for the dispensing function; specifically, the assembly may be adapted to render the pump capable of operation in either the gallon-based or the liter-based mode. Conversion is effected quickly, simply and at no cost, and the device may have tamper-and accident-resisting features, enabling facile intentional initial conversion while permitting reversal only with considerable difficulty. The assembly of the invention is of uncomplicated design, rendering it dependable, easy to install and service, and relatively inexpensive to manufacture.

Having thus described the invention, what is claimed is:

1. A converter for a fuel pump computer comprising: a housing; a drive shaft in said housing mounted for rotation about a fixed axis and adapted for driven engagement with the pump meter; a driven shaft in said housing coaxially rotatably mounted and adapted for driving engagement with the variator of the computer; a gear assembly comprised of two drive gears coaxially disposed for independent rotation about said fixed axis, at least one of said drive gears being a compound gear including first and second coaxial gear elements, said drive shaft and said driven shaft each being fixed to a different one of said drive gears; a slide member mounted in said housing adjacent said gear assembly for movement between first and second positions; a first idler gear mounted on said slide member for rotation about a first axis parallel to said fixed axis and spaced laterally to one side of said gear assembly, said first idler gear being constructed complementarily to mesh with said first gear element of said compound drive gear and the other of said drive gears, to couple them for conjoint rotation; a second idler gear mounted on said slide member for rotation about a second axis parallel to said fixed axis and spaced laterally to the opposite side of said gear assembly, said idler gear being complementarily constructed to mesh with said second gear element of said compound drive gear and said other drive gear, to couple them for conjoint rotation; biasing means in said housing urging said slide member toward said second position thereof; and mechanical locking means disengageably mounted in said housing to lock said slide member in said first position, and exteriorly accessible for disengagement to release said slide member for movement to said second position under the force of said biasing means, said idler gears being so positioned on said slide member that a different one of them engages said gear assembly in each of said positions thereof, whereby said slide member may be so positioned that said driven shaft is rotatable by said drive shaft in one ratio, by effecting the engagement of said first idler gear simultaneously with said other drive gear and said first gear element of said compound drive gear, and whereby said slide member may be repositioned so that said driven shaft is rotatable by said drive shaft in a different ratio, by effecting the interengagement of said second idler gear simultaneously with said other drive gear and said second gear element of said compound drive gear.

2. The converter of claim 1 wherein said other drive gear and said first idler gear are simple gears, wherein said secon idler gear is a compound gear having first and second gear elements constructed to mesh, respectively, with said other drive gear and said second gear element of said compound drive gear, and wherein said first and second gear elements of said compound drive gear are of different diameters, the diameter of said first gear element being equal to that of said other drive gear.

3. The converter of claim 2 wherein said first gear element of said compound drive gear and said other drive gear have the same number of teeth, whereby said driven shaft is rotatable by said drive shaft in a 1:1 ratio through engagement of said first idler gear.

4. The converter of claim 3 wherein said first gear element of said compound drive gear is of larger diameter than said second gear element thereof.

5. The converter of claim 4 wherein said other drive gear and its affixed shaft have an axial bore, wherein said compund drive gear has an affixed shaft portion seated within said bore with said first gear element thereof directly adjacent said other drive gear, and wherein said first and second gear elements of said compound idler gear are axially spaced from one another to accommodate said first gear element of said drive gear therebetween.

6. The converter of claim 5 wherein said drive shaft is engaged with said other drive gear and wherein said driven shaft is engaged with said compound drive gear.

7. The converter of claim 1 wherein said slide member moves on a rectilinear axis on which said first and second parallel axes are disposed, said fixed axis being offset therefrom.

8. The converter of claim 7 wherein said housing has a portion providing a recessed slideway for said slide member.

9. The converter of claim 8 wherein said locking means comprises a pin and wherein said housing has an opening to receive said pin in a position to engage said slide member.

10. The converter of claim 9 wherein said opening extends through said slideway-providing recessed portion and said pin resides partially within said slideway adjacent one end thereof when received therein, the corresponding end of said slide member abutting said pin in said first slide member position.

11. The converter of claim 10 wherein said biasing means acts upon the opposite end of said slide member.

12. The converter of claim 11 wherein said biasing means comprises a coil spring seated within said slideway adjacent the opposite end thereof.

13. The converter of claim 4 wherein said compound drive gear, said other gear and said compound idler gear are constructed to produce a nominal 3.7857:1 rotation ratio between said driven and drive shafts, whereby said converter is adapted to effect conversion between gallon-based and liter-based modes.

* * * * *